Dec. 11, 1956 R. J. GAUBERT 2,773,341

CONVEYING APPARATUS

Filed March 10, 1951 13 Sheets-Sheet 1

INVENTOR.
Rene J. Gaubert
BY Fisher and Swain
ATTORNEYS

Dec. 11, 1956 R. J. GAUBERT 2,773,341

CONVEYING APPARATUS

Filed March 10, 1951 13 Sheets-Sheet 2

INVENTOR.
R. J. Gaubert

Fleher & Swain
ATTORNEYS

CONVEYING APPARATUS

Filed March 10, 1951 13 Sheets-Sheet 3

INVENTOR.
Rene J. Gaubert

BY
[signature]

ATTORNEYS

Dec. 11, 1956 R. J. GAUBERT 2,773,341

CONVEYING APPARATUS

Filed March 10, 1951 13 Sheets-Sheet 4

INVENTOR.
Rene J. Gaubert

BY Fisher & Swain

ATTORNEYS.

Dec. 11, 1956 R. J. GAUBERT 2,773,341

CONVEYING APPARATUS

Filed March 10, 1951 13 Sheets-Sheet 5

INVENTOR.
Rene J. Gaubert
BY Flehr & Swain
ATTORNEYS

INVENTOR.
Rene J. Gaubert
BY Flehr & Swain
ATTORNEYS

INVENTOR.
Rene J. Gaubert
BY Fisher & Swain
ATTORNEYS

INVENTOR.
Rene J. Gaubert

BY Fisher & Swain

ATTORNEYS

Dec. 11, 1956 R. J. GAUBERT 2,773,341

CONVEYING APPARATUS

Filed March 10, 1951 13 Sheets-Sheet 9

INVENTOR.
Rene J. Gaubert

BY Fisher & Swain

ATTORNEYS

Dec. 11, 1956 R. J. GAUBERT 2,773,341

CONVEYING APPARATUS

Filed March 10, 1951 13 Sheets-Sheet 10

INVENTOR.
Rene J. Gaubert

BY Flehr & Swain

ATTORNEYS

CONVEYING APPARATUS

Filed March 10, 1951

INVENTOR.
Rene J. Gaubert

BY Fisher & Swain

ATTORNEYS

Dec. 11, 1956 R. J. GAUBERT 2,773,341

CONVEYING APPARATUS

Filed March 10, 1951 13 Sheets-Sheet 12

INVENTOR.
R. J. Gaubert

BY Fisher & Swain

ATTORNEYS

Dec. 11, 1956 R. J. GAUBERT 2,773,341

CONVEYING APPARATUS

Filed March 10, 1951 13 Sheets-Sheet 13

INVENTOR.
Rene J. Gaubert

BY Fisher & Swain

ATTORNEYS

United States Patent Office 2,773,341

Patented Dec. 11, 1956

2,773,341

CONVEYING APPARATUS

Rene J. Gaubert, Oakland, Calif., assignor, by mesne assignments, to Food Machinery and Chemical Corporation, San Jose, Calif., a corporation of Delaware Application March 10, 1951, Serial No. 214,880

21 Claims. (Cl. 53—187)

This invention relates generally to conveying apparatus suitable for the transfer of various objects between operating stations. It is particularly applicable for use in conjunction with bag or carton filling operations.

In Patent No. 2,676,442 there is disclosed a machine which serves to manufacture bags from cellophane, Pliofilm or like material, and to fill these bags automatically with various products such as candy, nuts, dried fruits, and other products of suitable size and character for packaging in bags. Such a machine requires special conveyong means to convey the bags through the various operating stations. Thus the bags after they are manufactured must be conveyed successively to filling station where the bags are opened and a weighed or measured amount of the product inserted. From the filling station the bags must be transferred successively to one or more additional stations for such operations as shaking, sealing and the like. The bags must therefore be moved intermittently both before and after being filled, and they must be moved in such a manner that the bags are not in any way injured and whereby the bags are presented relatively accurately to the various operating stations.

In my copending application Serial No. 167,404, filed June 10, 1950, and entitled "Conveying Apparatus," there is disclosed conveying equipment suitable for use with machines of the type described above. The present application is concerned with certain improvements to the conveying apparatus of said application Ser. No. 167,404 whereby I am enabled to attain the objects hereinafter stated.

In general it is an object of the present invention to provide improved conveying apparatus of the above character, having novel means serving to engage the bags for intermittent movement and which will avoid injury to the bags when filled.

Another object of the invention is to provide improved conveying means of the above character having provision for engaging and retaining the bags between intervals of movement.

Another object of the invention is to provide improved apparatus of the above character having provision for vibrating or jiggling the filled bag to compact the material contained therein.

Another object of the invention is to provide apparatus of the above character having novel provision to facilitate adjustment of the machine for the handling of bags of different sizes.

Additional objects and features of the invention will appear from the following description in which the preferred embodiment has been illustrated in conjunction with the accompanying drawing.

Referring to the drawing.

Figure 3A:
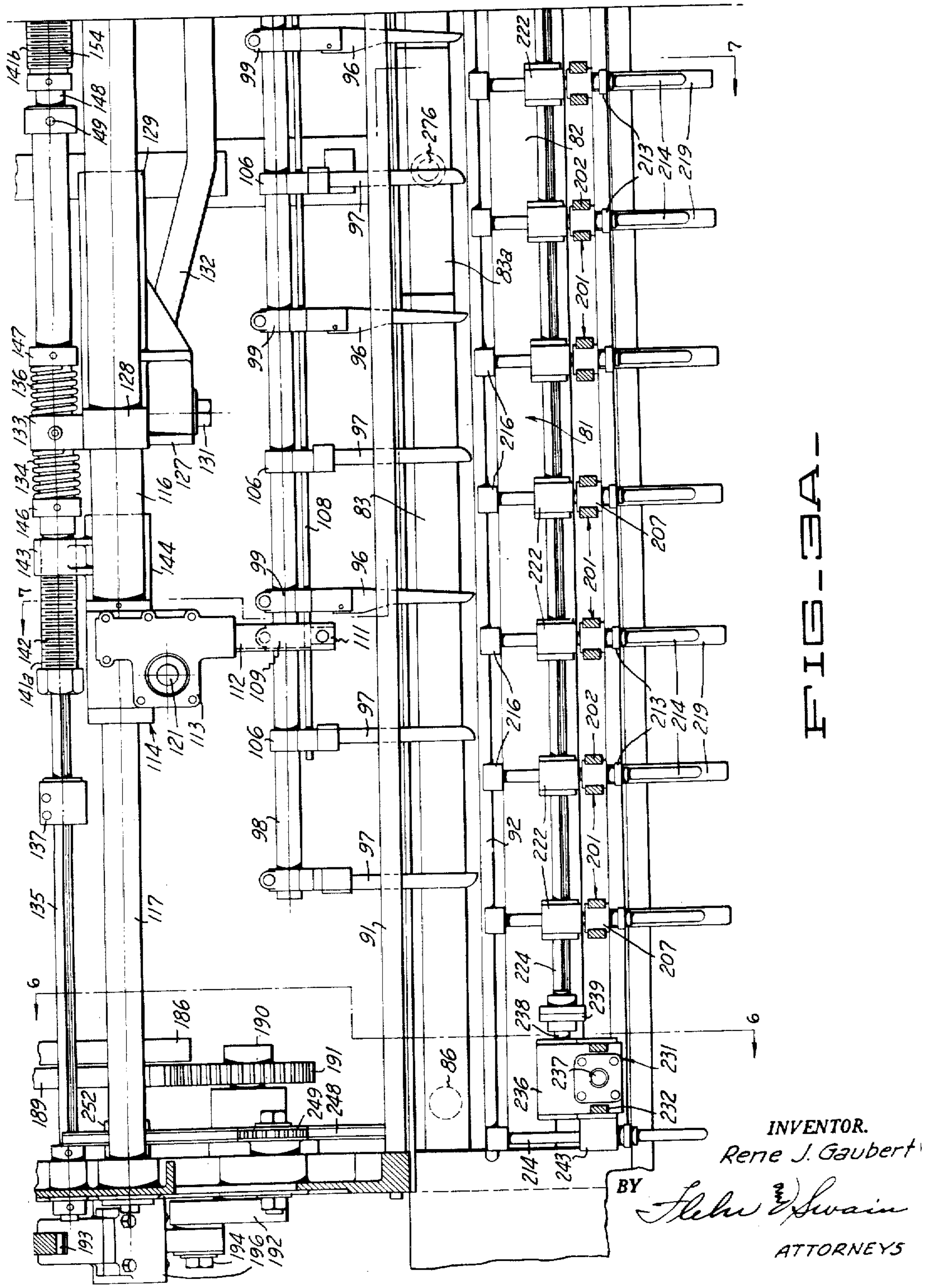
Figures 3B, 4:
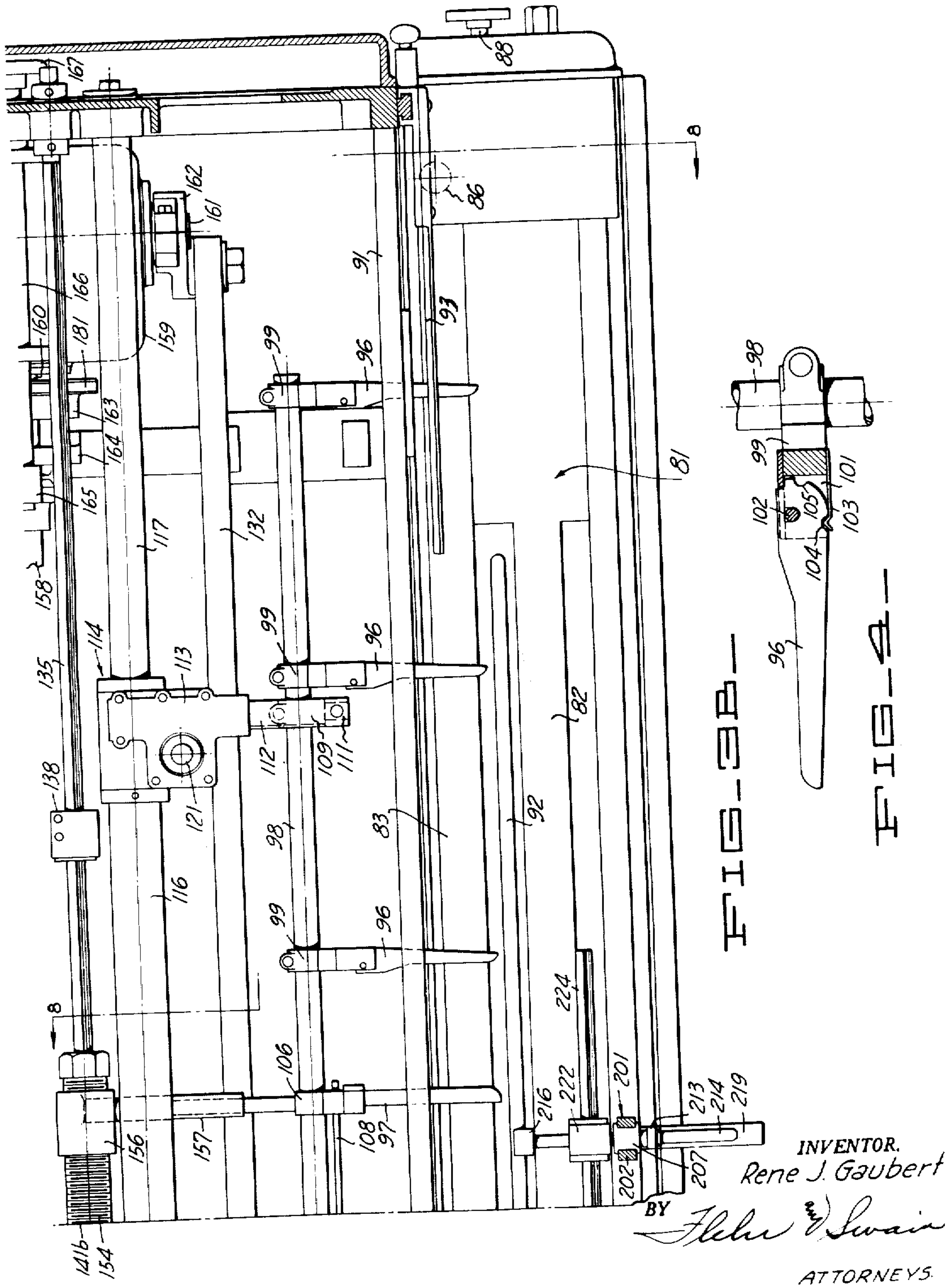

Figures 3A and 3B, taken together, comprise an enlarged plan view of the conveying apparatus, with the frame and certain other parts in section.

Figure 4 is a cross-sectional detail on an enlarged scale, showing the construction of one of the pusher fingers.

Figure 5:
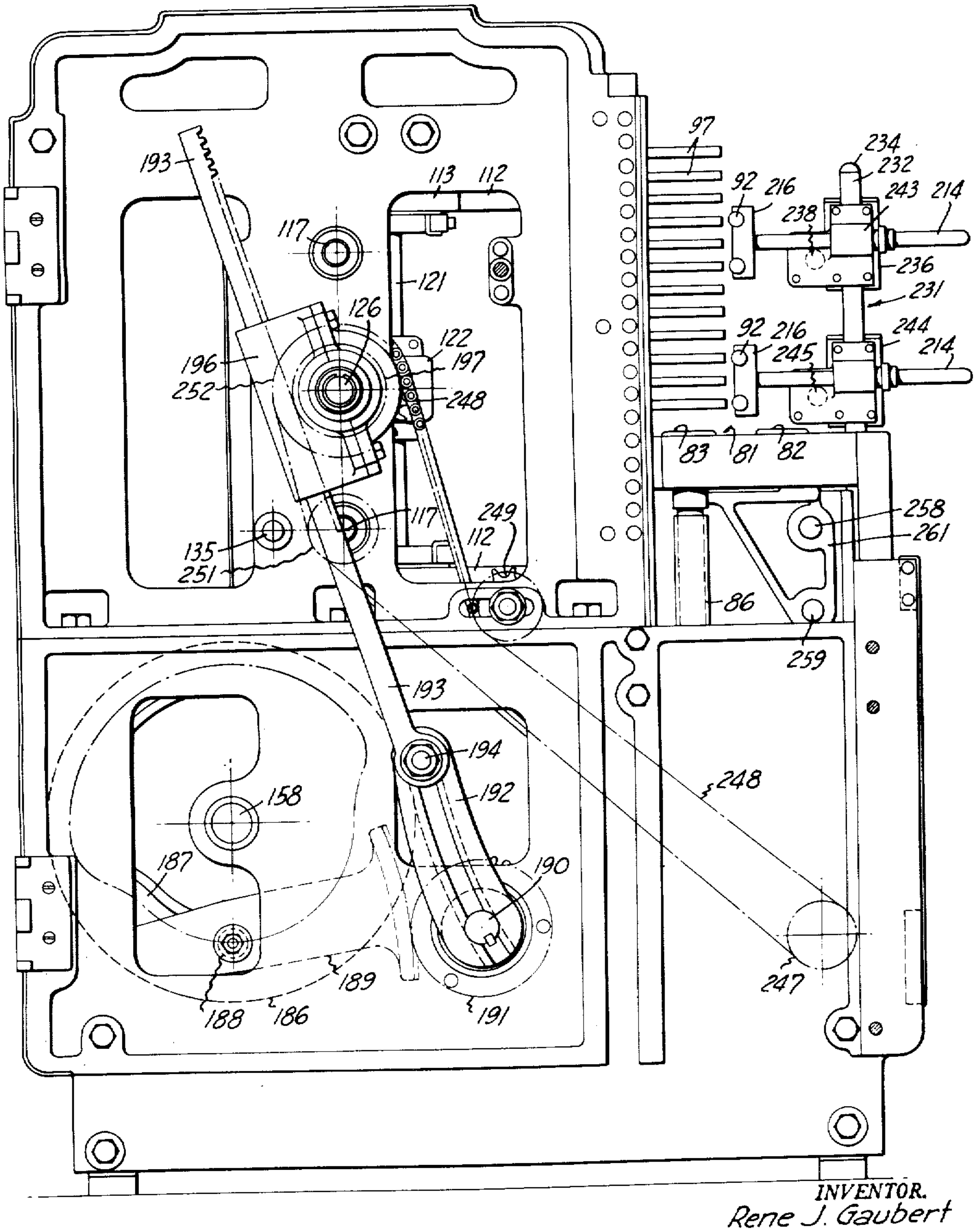

Figure 5 is an end view of the conveying apparatus, looking toward that end of the same remote from the bag making machine.

Figure 6:
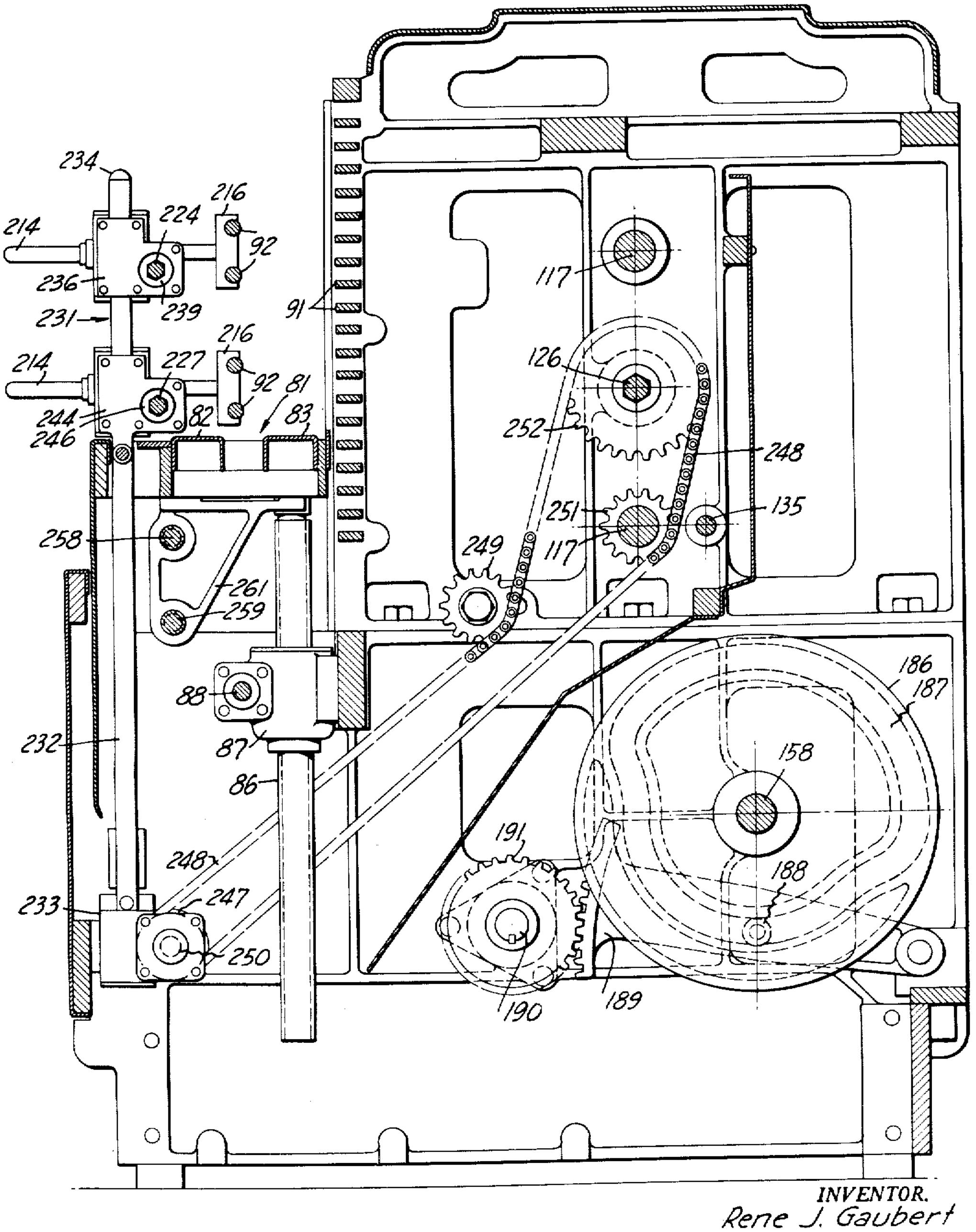

Figure 6 is a cross-sectional view taken along the line 6—6 of Figure 3A.

Figure 7:
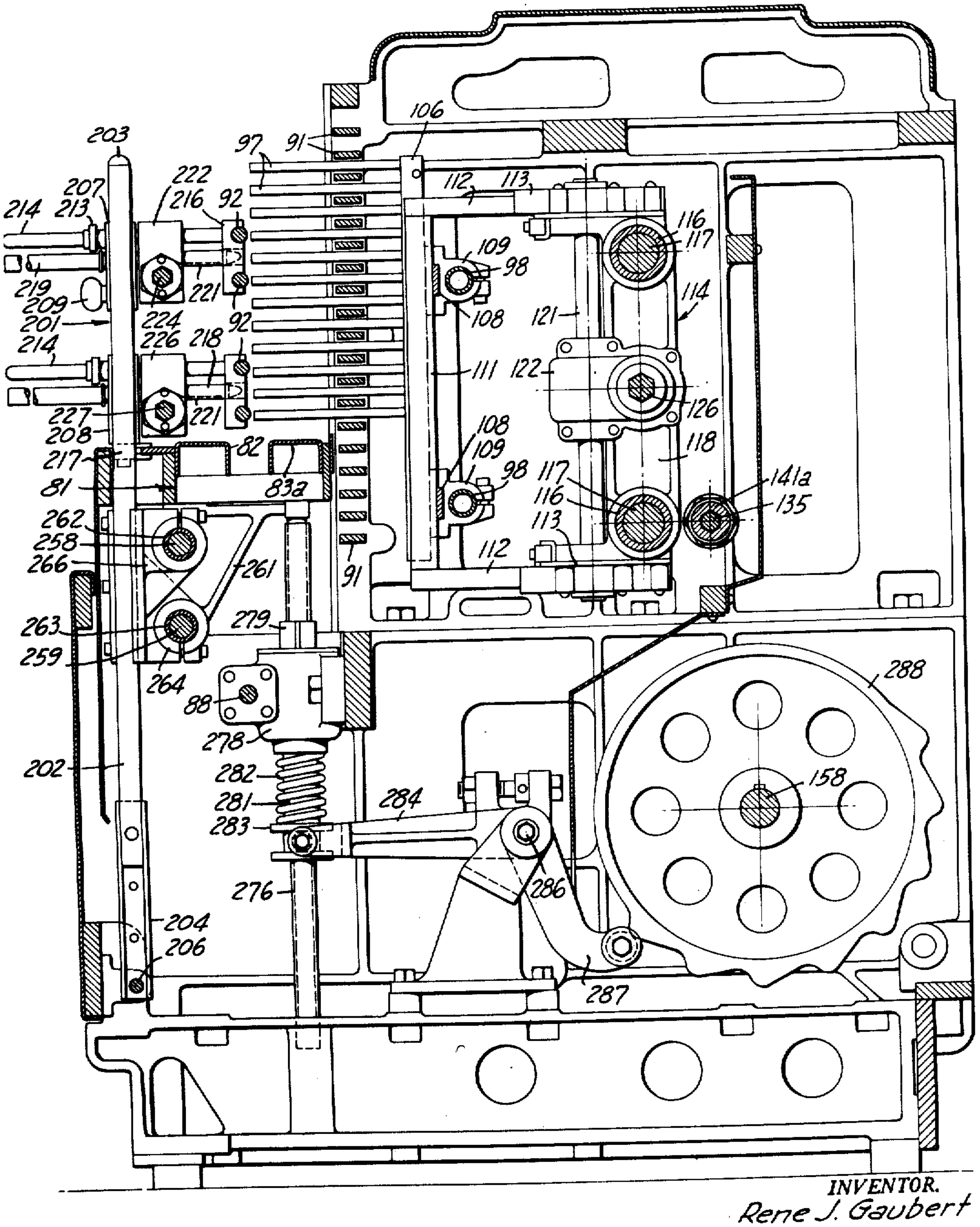

Figure 7 is a cross-sectional view taken along the line 7—7 of Figure 3A.

Figure 8:
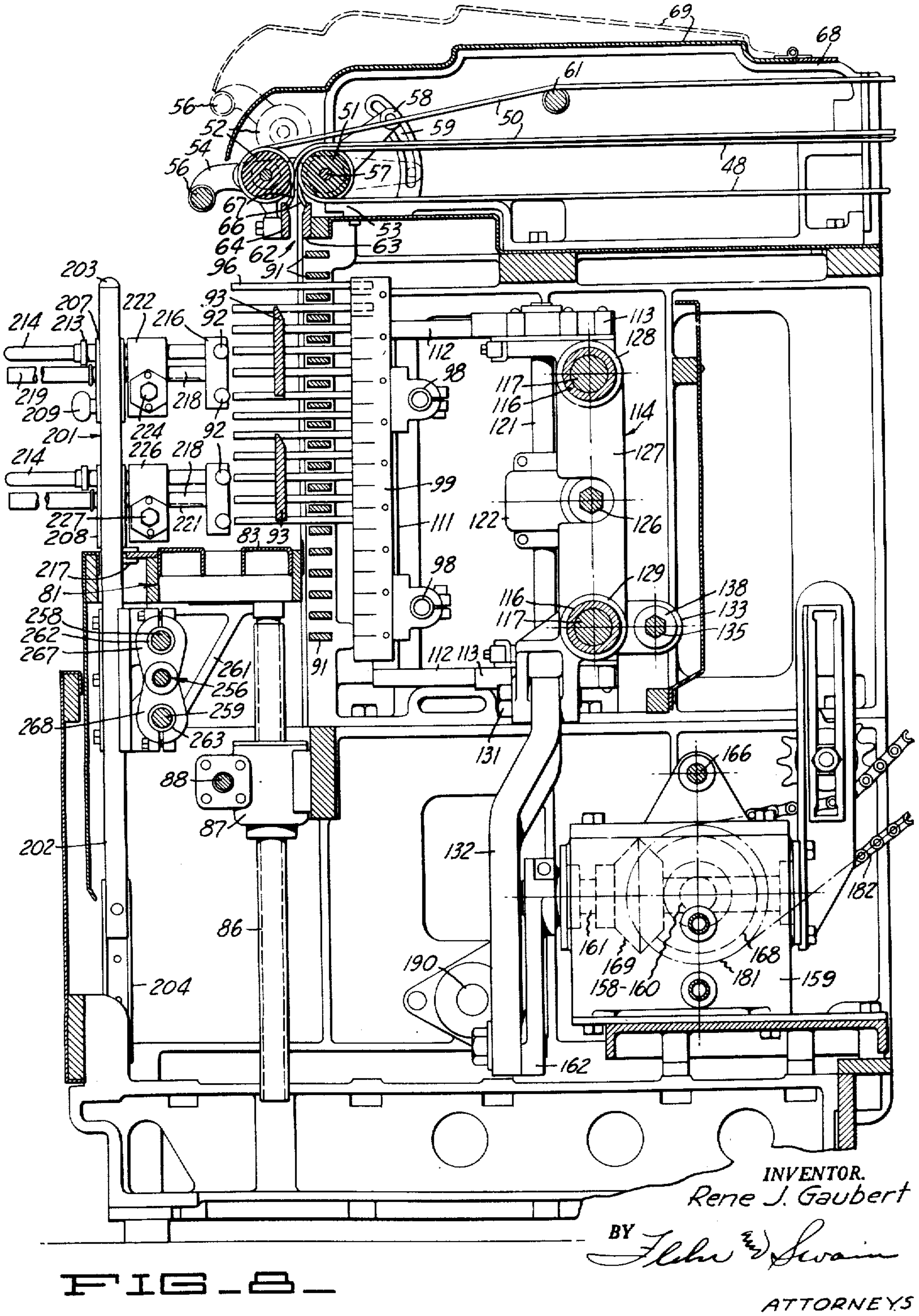

Figure 8 is a cross-sectional view taken along the line 8—8 of Figure 3B.

Figures 9, 10:
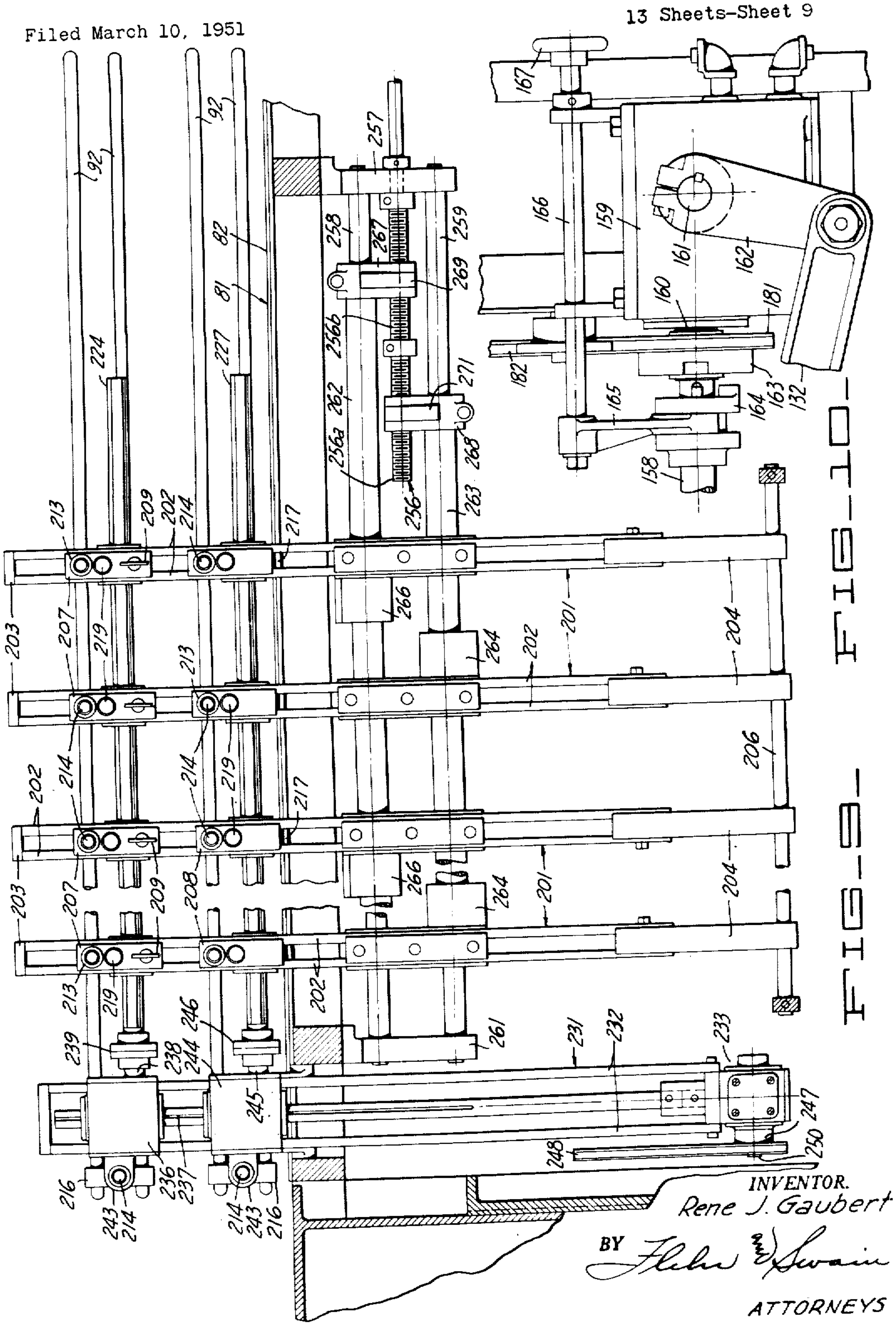

Figure 9 is a subassembly of parts carried in front of the operating table, and including means for engaging the filled bags between intervals of movement.

Figure 10 is a detail illustrating mechanism for securing horizontal reciprocation of the bag moving means.

Figures 11, 12, 13:
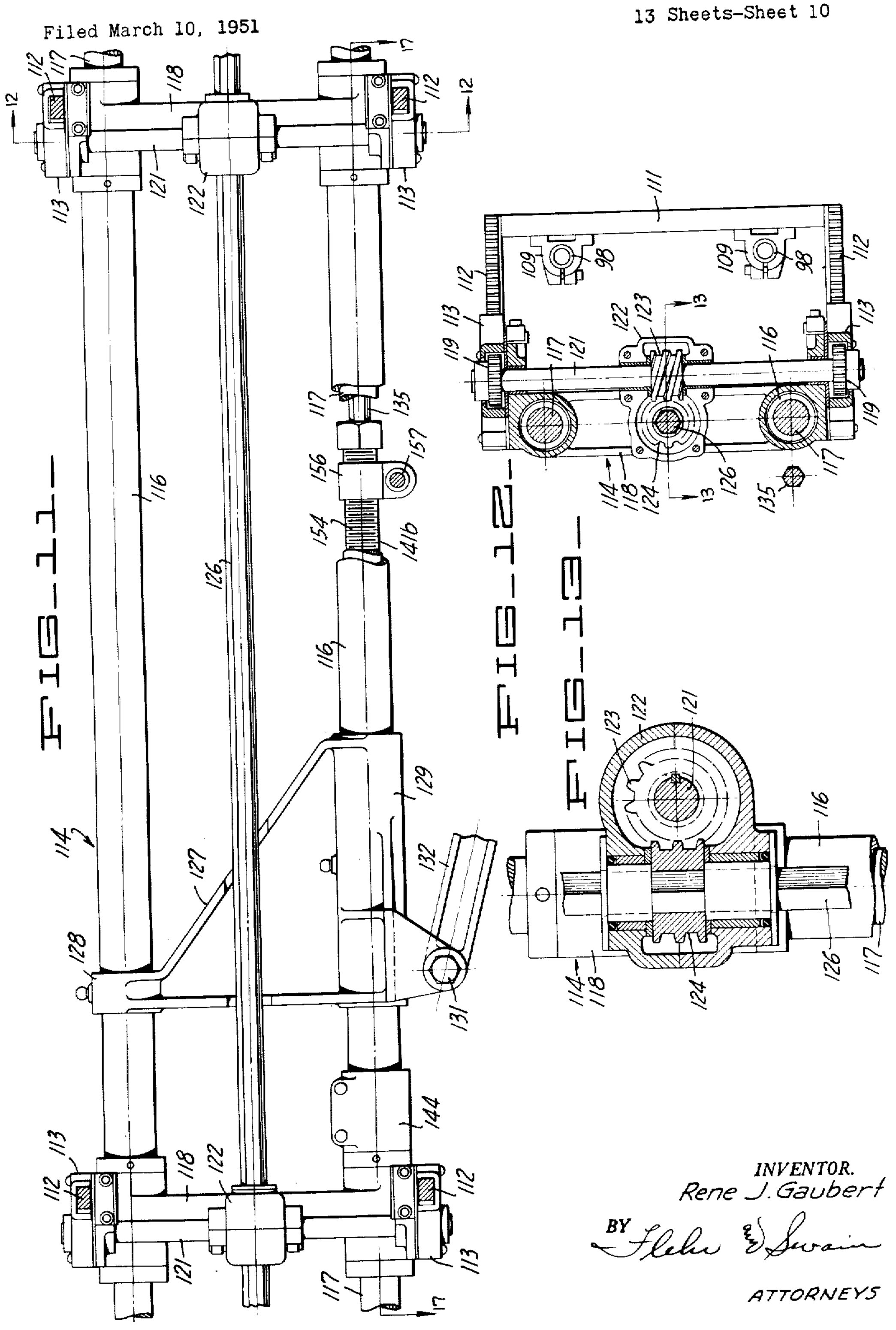

Figure 11 is a side elevational detail illustrating the carriage for causing horizontal movement of the bag engaging means.

Figure 12 is a cross-sectional detail taken along the line 12—12 of Figure 11.

Figure 13 is a cross-sectional detail taken along the line 13—13 of Figure 12.

Figures 14, 15, 16:
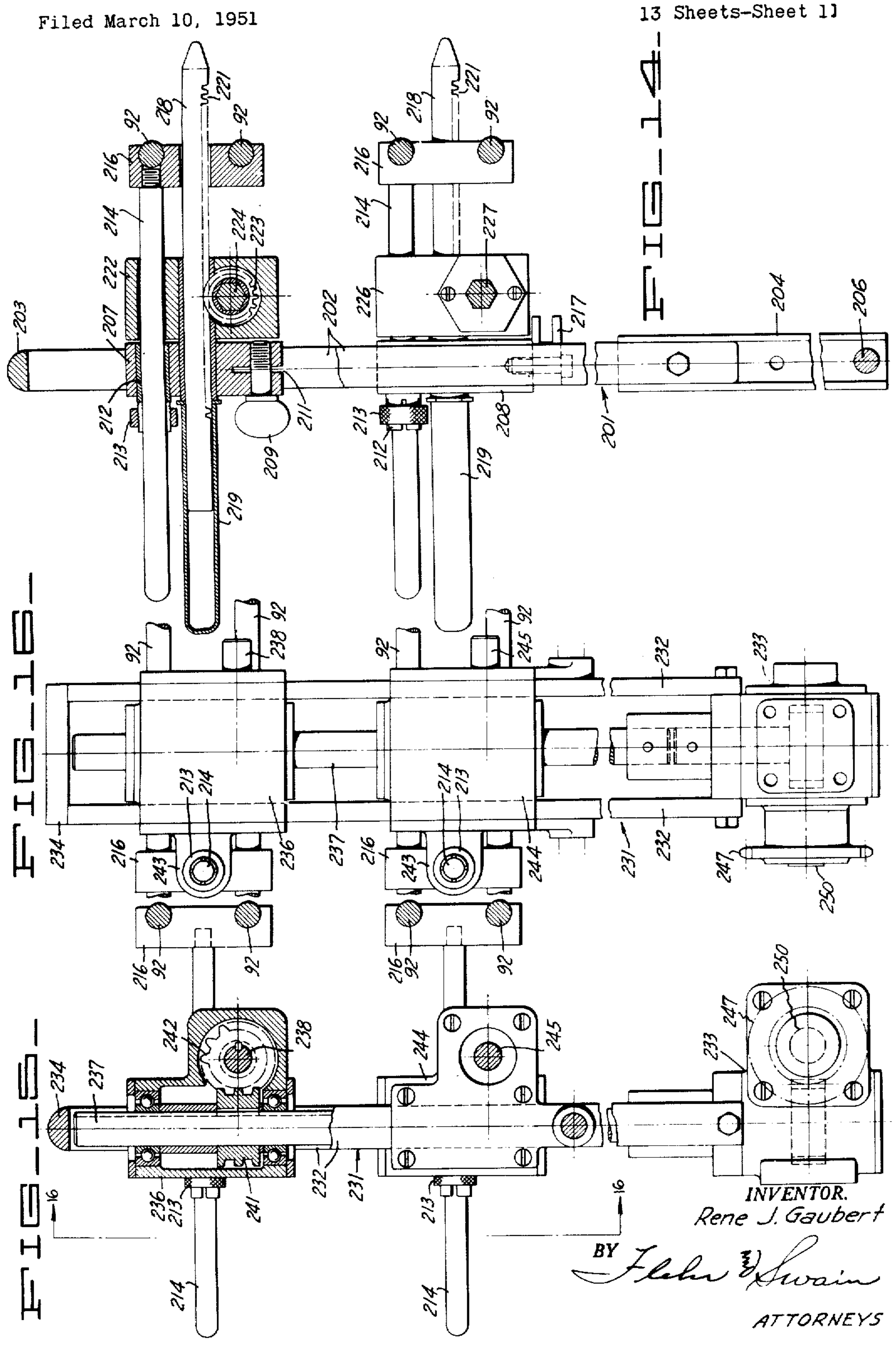

Figure 14 is a subassembly detail illustrating particularly the means at the forward side of the machine for engaging the filled bags, certain parts being in section.

Figure 15 is a view looking toward the left-hand side of Figure 14, and likewise with certain parts in section.

Figure 16 is a view taken along the line 16—16 of Figure 15.

Figure 17:
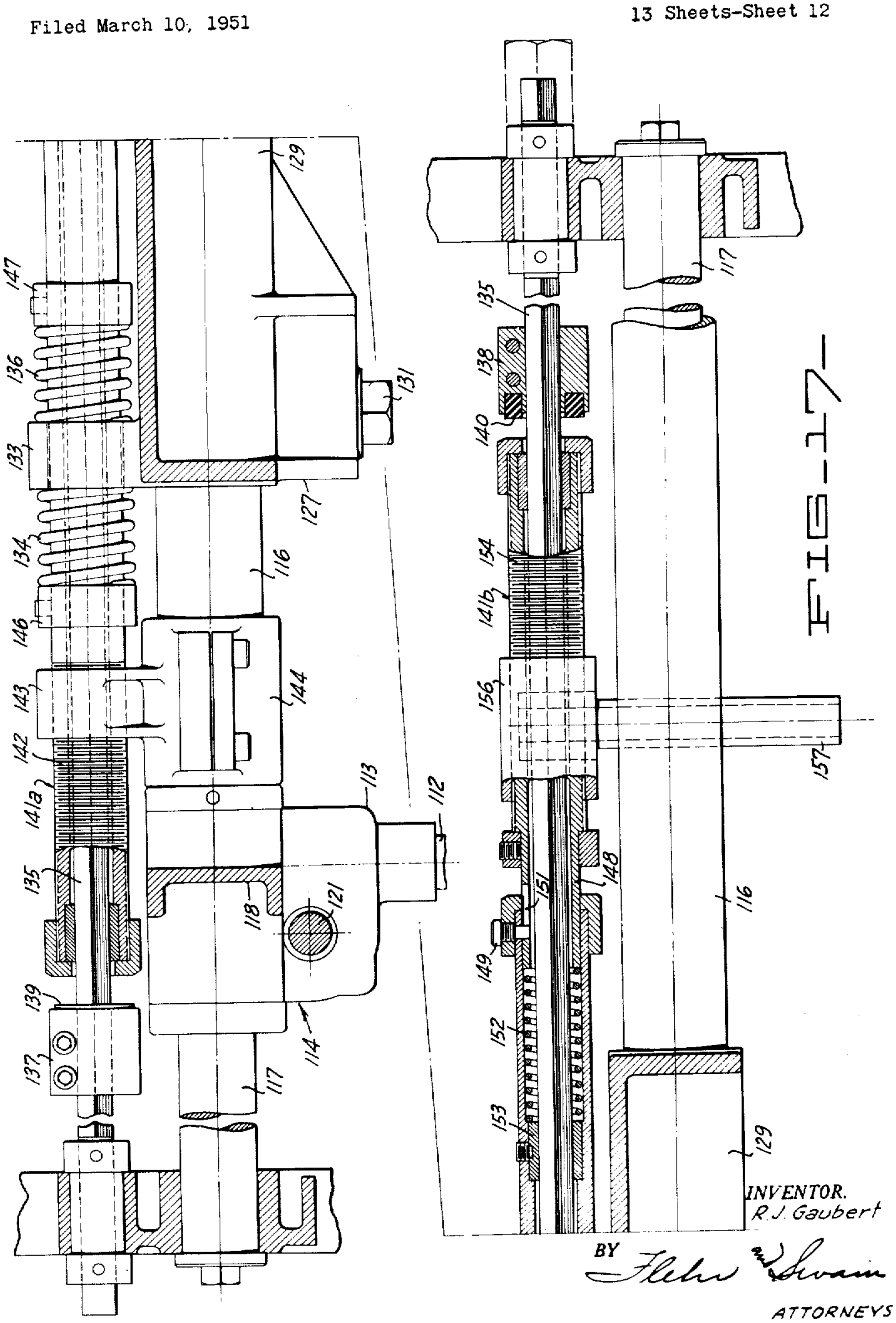

Figure 17 is a cross-sectional detail taken along the line 17—17 of Figure 11 showing the mechanism for transmitting reciprocating motion to the carriage and for securing relative movement between the groups of bag engaging fingers.

Figures 18 to 22 inclusive are schematic views showing the positioning of various bag engaging parts during an operating cycle.

Figure 1:
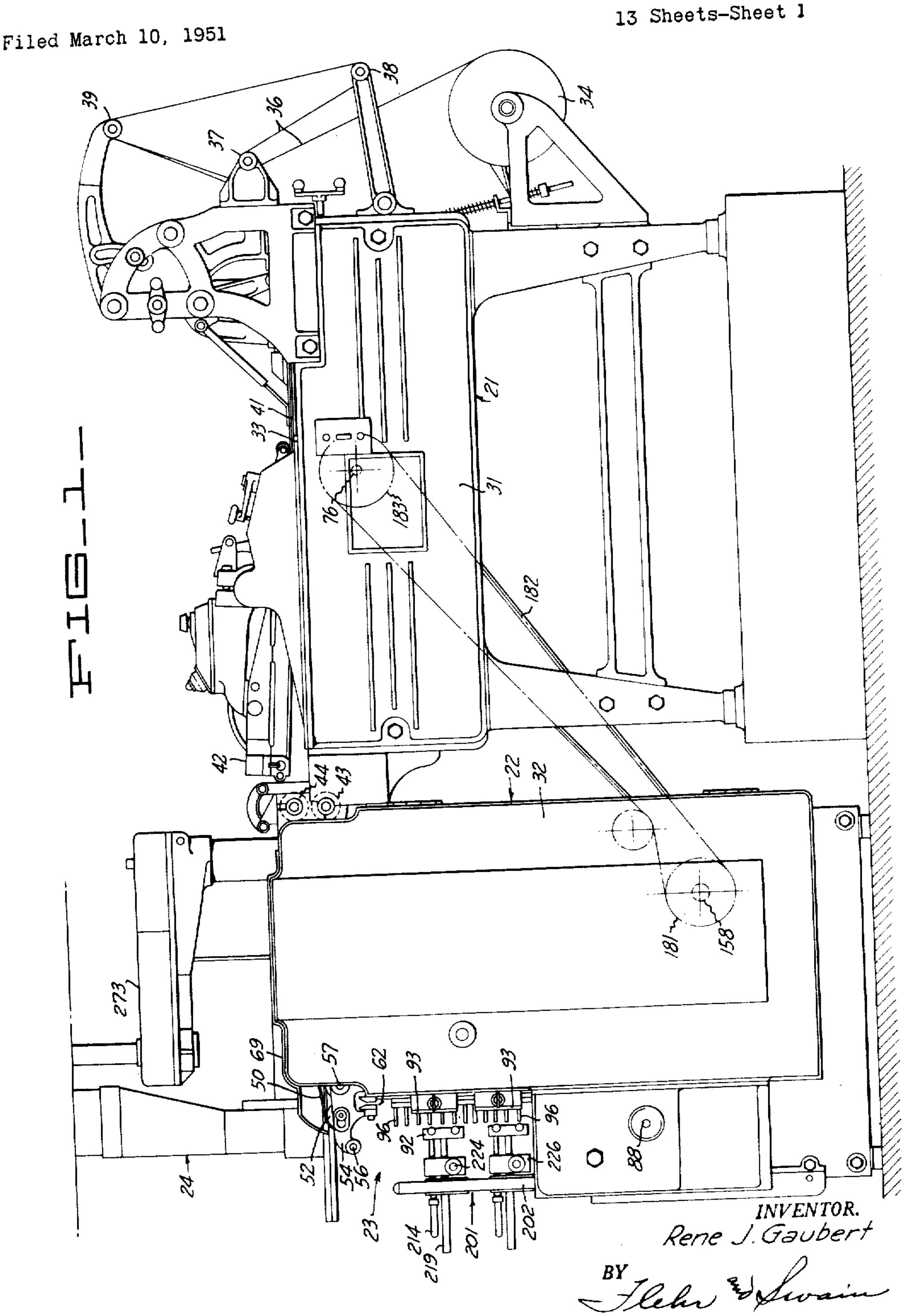
Figure 1 is an end view showing a machine incorporating the present invention, and operatively associated with a bag making machine.

To facilitate an understanding of the conveying apparatus forming the present invention, I have illustrated it incorporated in a complete bag making and filling machine as disclosed and claimed in the aforesaid Patent No. 2,676,442. In general the complete machine (see Figures 1 and 2) includes a bag making unit or machine 21, a conveying means 22 which receives bags from the bag making unit, and an intermittent conveying means 23, which receives the bags and presents them to the several operating stations. Operating stations may include the bag filling station 24, a vibrating or jiggling station 25, and the sealing station 26.

For the bag making unit I prefer to use a machine which will prepare the bags from a web of material and present them successively to the conveying means 22. A suitable machine for this purpose is disclosed and claimed in my Patent 2,347,902 entitled "Bag Making Machine and Method." As illustrated in the present drawing such a bag making unit comprises a frame 31 which can be suitably attached to the main frame 32 of the machine, and which provides a working table 33. The rear end of the machine is arranged to support the roll 34 of suitable bag making material such as moisture-proof cellophane, Pilofilm, polyethylene or the like. The web 36 from this roll is shown extending over the rolls 37, 38, 39 and from thence under the rear end of the former mandrel 41. This mandrel corresponds to the mandrel 91 of Patent 2,347,902. Overlying the mandrel 41 there is an electrically heated sealer 42, the lower surface of which is T-shaped. The sealer is periodically reciprocated to perform a heat sealing operation on the bottom end of the bag, and for making the longitudinal seam.

As explained in said Patent 2,347,902 the machine incorporates means for folding a projecting end portion of the bag material over the forward end of the mandrel immediately preceding the sealing operation, together with means for thereafter reciprocating the mandrel to translate the finished end of the bag into engagement with the rollers 43 and 44, which correspond to the rollers 116, 117 of Patent 2,347,902. In addition, knives (not shown) are provided in proximity with the feed rolls 43 and 44, which sever the finished bag from the remainder of the material along a line adjacent to but spaced from the vertical plane coincident with the axis of rollers 33, 34.

The cycle of operation of the bag making unit is as follows: As the web of material is drawn beneath the mandrel 41, the two side margins of the web are folded over the top of the mandrel into overlapping relation. Assuming that a previous bag has been completed, the overlapping portions of the web will be heat sealed for a substantial distance from the cut end of the material, so that in effect there is a tube of bag forming material about the mandrel. A sufficient amount of material projects beyond the end of the mandrel to form the bottom of a bag. Folding means turns the projecting end of the material up and over the end of the mandrel, and immediately thereafter the heat sealing means 42 is depressed to heat seal the bottom of the bag and at the same time to extend the length of the longitudinal seam. The mandrel is then reciprocated so that the folded-over and heat-sealed end of the bag is translated into engagement with the rollers 43 and 44, and at the same time these rollers are rotated in opposite directions to draw a predetermined length of material from the mandrel. The rollers are then separated a sufficient amount to release their grip upon the bag, and thereafter the cutting means severs the bag a short distance from the rollers 43, 44. During this cutting operation rotation of the rollers 43 and 44 is interrupted, but immediately after the bag is cut, the rollers are rotated again for a short interval to advance the cut bag by the conveying means to be presently described. This last rotation occurs during a sealing operation for forming the next bag.

As will be presently explained, a common drive is provided for the bag making unit and the other parts of the machine, whereby the bags are made at a rate corresponding to the rate with which the bags are received and successively handled by the remainder of the machine. The means for rotating and releasing rollers 43 and 44, and the construction of the completed bags, will be presently described in greater detail.

The conveying means 22 is similar to that illustrated in my copending application Serial No. 167,404 but differs particularly in that means is provided for delivering the bags either to the intermittent conveying means 23, or for by-passing the bags when it is not desired to supply additional bags to the conveying means 23. Thus referring to Figure 8, taken together with Figures 1 and 2, the roller 43 is provided with a plurality of grooves (not shown) which serve to track the looped ends of the laterally spaced belts 48. Roller 44 is also provided with laterally spaced grooves 49 for tracking the laterally spaced belts 50. A pair of parallel rollers 51 and 52 are similarly grooved and engaged the other looped ends of the belts 48 and 50. Roller 51 is carried by the stationary bracket 53, while roller 52 is journaled to side arms 54, which are connected by the handle 56. The arms 54 are journaled to the shaft 57, which forms the shaft for the roller 51, and one of these arms is provided with a rear extension 58, the extremity of which is provided with a stud for operating in the arcuate groove 59. With this arrangement the handle 56 can be either in the position illustrated in Figure 8, with the rollers 51 and 52 side by side, or it may be swung upwardly to a position (see dotted line, Figure 8) in which the roller 52 is located somewhat above the roller 51. Conventional detent means (not shown) can be employed to releasably retain the handle 56 in either one of its two extreme operating positions. As illustrated in said application Serial No. 167,404 there may be three belts 48 and four belts 50, with the two sets of belts in interposed vertical planes. The upper runs of the belts 50 can have light contact with the transverse roller 61. With the handle 56 in the lowered operating position illustrated in Figure 8, the lower runs of the belts 50 engage a portion of the periphery of roller 51, between the grooves provided in the latter. The belts 48 and 50 are made of suitable material providing a substantial amount of stretch, such as resilient rubber, or preferably of helicoid wire springs. The upper runs of the belts 48 and the lower runs of belts 50 are preferably slightly interleaved whereby when a bag progresses to the left from engagement with the rollers 43 and 44, it is caused to assume a corrugated form whereby it is held in tight frictional engagement with the belts.

It is desirable to provide a chute or guideway for the discharge of bags from the rollers 51, 52. Thus a discharge mouth 62 is provided, which is formed from the spaced parallel tapered bars 63, 64. Both bars are connected at their ends and are carried by the side arms 54. Curved stripper and guide fingers 66 and 67 are carried by the bars 63, 64, and have their upper ends terminating in the grooves formed in the rollers 51, 52. It will be apparent that when the handle 56 is in the position shown in Figure 8, the chute 62 is effective to guide bags downwardly for delivery into the intermittent conveying means 23. However, when the handle 56 is swung upwardly the bars 63 and 64 swing upwardly with the handle and therefore the bags are discharged in such a manner as to by-pass the conveying means 23. It may be explained that the belts 48 and 50 have sufficient stretch whereby they have sufficient tension for either position of the roller 52 to properly convey the bags.

It is desirable to completely enclose the working parts of the conveying means 22 by the protective hood 68, which may be provided with a hinged cover 69.

Figure 2:
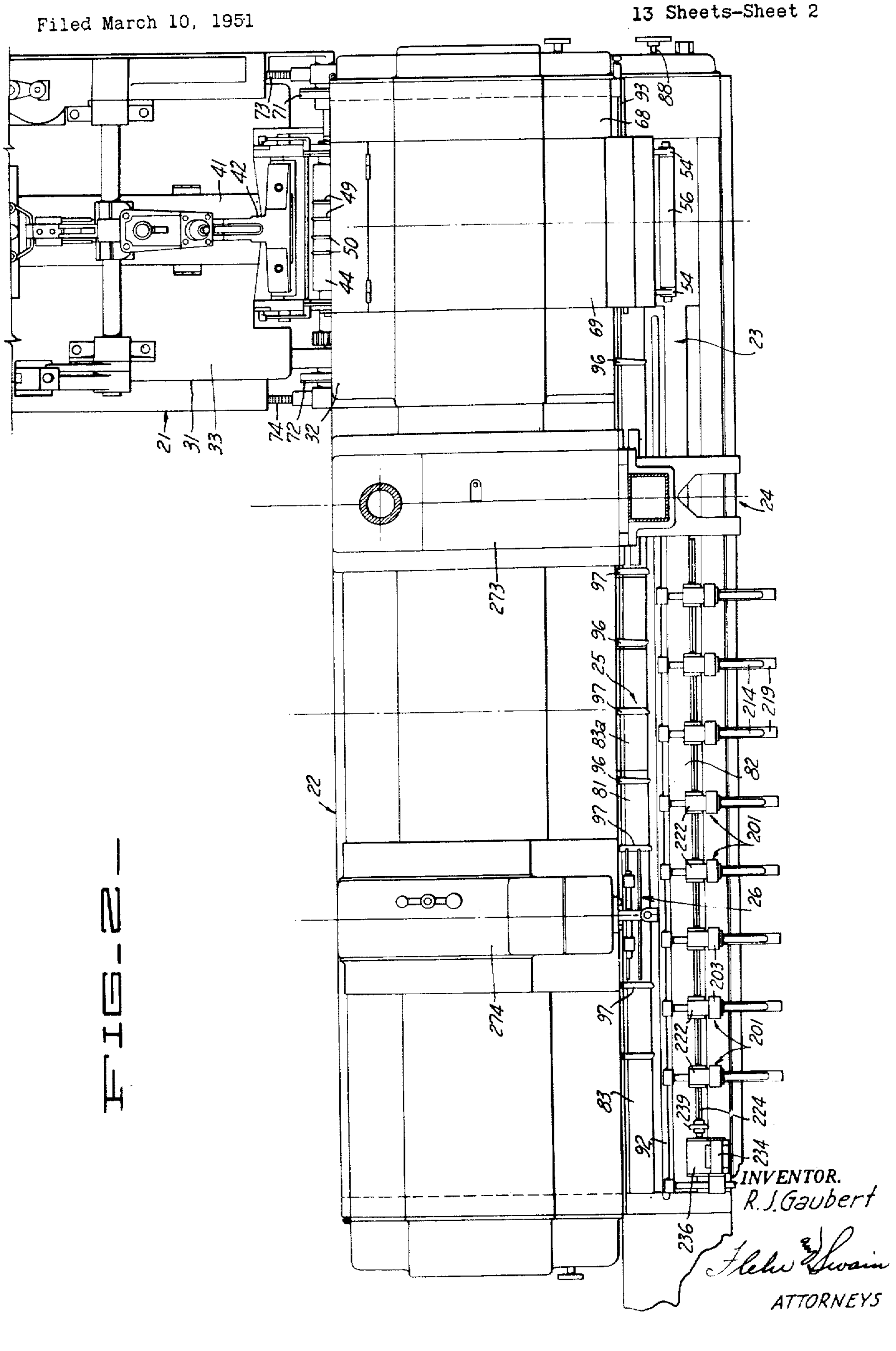
Figure 2 is a plan view of the machine illustrated in Figure 1 and illustrating only a part of the bag making machine.

As explained in said application Serial No. 167,404, in the operation of the machine the rollers 43 and 44 are rotated to withdraw the finished bag from the forming mandrel and for advancing it to the conveying means 23. Part of the mechanism for effecting this rotation is shown in Figure 2. At one side of the bag making machine the shaft for the lower roller 43 is coupled to an overrunning clutch 71, and on the other side it is coupled to a like overrunning clutch 72. The drive shafts of the two overrunning clutches 71 and 72 are connected to pinions (not shown) which in turn are operated by the reciprocating racks 73 and 74. Rack 73 corresponds with the gear rack 152 of my Patent 2,347,902 (see Figure 8 of patent) and is operatively attached to an adjustable throw crank, which in turn is mounted upon the main transverse shaft 76 of the bag making machine, all as shown in said Patent 2,347,902. Thus for each bag making cycle reciprocation of the rack 73 causes a predetermined amount of rotation of the roller 43 in a counterclockwise direction as viewed in Figure 1.

Upon the other side of the bag making machine the rack 74 is similarly connected to a crank disc which in turn is mounted upon the same transverse shaft 76. The stroke of rack 74 is arranged whereby after rack 73 has caused rotation of roller 43, and there has been a period of pause during which the bag is being severed, rack 74 causes a further amount of rotation of roller 43, which motion occurs during the heat sealing operation of the next bag making cycle.

As described in Patent 2,347,902, the means for bringing the two rollers 43 and 44 together into gripping engagement with a bag and for separating these rollers to release the bag, includes cam means carried by the same shaft 76. This means operates to press the rollers 43 and 44 upon the bag during the rotation caused by rack 73, and then the rollers are separated and remain in this relation during rotation by rack 74, and until the rollers are caused to engage the next bag.

The conveying means 23 extends horizontally across the front of the machine, and progresses the bags intermittently through the various operating stations. In general this conveying means consists of elements which are cyclically operated to recurrently move the bags along a horizontal supporting table, together with additional elements which are cyclically operated to engage and retain the bags in upright position, after they have been filled with a product. The conveying means 23 as illustrated consists of an extended table 81, which includes a separate frame carrying the parallel supporting rails 82, 83. These rails are adapted to support bags while the same are being intermittently moved through the operating stations. The entire table is preferably adjusted in a vertical direction, and is shown carried by the threaded support rods 86, which in turn extend slidably through the stationary castings 87. A horizontal shaft 88 extends through the castings 87, and within the castings suitable gear means is provided whereby when shaft 88 is rotated, a nut within each casting which is threaded upon the associated rod 86 is rotated to cause that rod to be raised or lowered accordingly. One end of the shaft 88 can be formed to facilitate application of an operating crank. For the smaller sized bags, rail 83 functions as the sole supporting surface.

The table 81 is disposed alongside a plurality of vertically spaced guide rails 91 (Figure 6). These rails are suitably secured together at regularly spaced intervals, and they are also attached to the main frame. Located in front of the guide rails 91, and spaced therefrom a distance depending upon the size of the bags being handled, are the vertically spaced guide rods 92. These rods are held in place by means to be presently described. At the receiving end of the conveyor 23 guide strips 93 can be disposed in relatively close proximity with the guide rails 91 (see Figure 8) whereby flat empty bags delivered downwardly from the rollers 51 and 52, are deposited between strips 93 and the guide rails 91, and while so confined are translated to the guide rods 92. Rods 92 have their entrant ends (Figure 3B) commencing at the discharge ends of strips 93.

The bag engaging elements 96 and 97 are in the form of fingers which extend between the guide rails 91. These fingers are arranged in vertically disposed groups, all of which are carried by the horizontal rods 98. Thus a number of racks 99 are adjustably clamped at spaced intervals to the rods 98, and serve to pivotally carry the fingers 96. The mounting for each finger is illustrated particularly in Figure 4. Thus each finger is accommodated within a slot 101, and is retained by the pivot pin 102. A spring pressed detent 103 is adapted to engage in either one of the two notches 104 or 105. When engaged with the notch 104 the finger 96 is extended as illustrated. Each such finger however can be swung horizontally about the pivot pin 102 to an out of the way position, in which it extends substantially parallel to the guide rails 91, rather than through the same. Thus some of the fingers 96 can be moved out of the way to accommodate a raised position of the table 81.

The fingers 97 are disposed in groups (Figures 3A, 3B and 7) and are carried by the racks 106. Preferably each finger is socketed within the rack, and retained by suitable detent means whereby it can be removed when desired. The fingers 97 are adapted to interleave through the rails 91, the same as the fingers 96. As will be presently explained means is provided for causing the racks 106 to slide a limited distance on the rods 98, for the engagement and disengagement of the filled bags. All of racks 106 are attached to a common operating rod 108, which is actuated in a manner to be presently explained.

The rods 98 are adjustably engaged by the clamps 109 (Figure 12) which in turn are mounted in pairs upon the vertical bars 111. Each vertical bar 111 has its ends attached to the horizontal gear racks 112, which slidably extend through housings 113. These housings form a part of a carriage 114, which is located generally behind the rods 98, and which is adapted to be horizontally reciprocated.

The carriage 114 includes the tubes 116 (Figure 11), which slidably embrace the stationary rods 117. The ends of these rods are attached to the main frame of the machine. Castings 118 form a mounting for the housings 113 (Figures 11 and 12) and are fixed to the end portions of the tubes 116.

Within the housings 113 (Figure 12) the racks 112 are engaged by gears 119, which are secured to the ends of the vertical shafts 121. Each casting 118 is formed to provide the intermediate gear housing 122 through which the associated shaft 121 extends. A gear 123 on each shaft 121 engages a gear 124 within the housing 122, and the two gears 124 are operatively driven by the common horizontal shaft 126 (Figures 11 and 13). A noncircular (e. g. hexagonal) shaft can be employed as illustrated, whereby a drive relation is maintained between the shaft and the gears without interfering with reciprocating motion of the carriage, while the shaft 126 remains relatively stationary. The ends of the shaft 126 are suitably journaled in the main frame of the machine, and the shaft is oscillated by means to be presently described.

A portion of the means employed for reciprocating the carriage 114, is illustrated in Figures 3A, 3B and 11. Thus a casting 127 has portions 128, 129 which slidably embrace the tubes 116. The casting has a pivotal attachment 131 with an operating link 132. The rear side of the casting is provided with an extended lug 133 which is operatively coupled through compression springs 134 and 136 with one of the tubes 116. This coupling means includes an assembly illustrated particularly in Figures 3A, 3B and 17. Thus at the rear of the machine and extending parallel to the guide rods 117 there is a rod 135 which has its ends suitably attached to the main frame of the machine. Collars 137 and 138 are adjustably mounted upon this rod, and form stops for the assembly associated with the same. It is desirable for these collars to be provided with inset rubber facings 139, 140. A tubular assembly is carried by the rod 135 between the stop collars 137 and 138, and includes the tubular sections **141*a* and 141*b*. Section 141*b* has a threaded portion 142, which has threaded engagement with a lug 143. This lug forms a part of the clamping device 144, which is fixed to the adjacent tube 116. The compression springs 134, 136 are disposed on opposite sides of the lug 133, and seat upon the collars 146, 147. The tubular section 141*b* has a portion 148 of reduced diameter which slidably extends within section 141*a*. A limiting pin 149 which is mounted upon the adjacent end of section 141*a*, extends within a slot 151 formed in the portion 148. A compression spring 152 has its one end engaging tubular portion 148, and its other end seated upon a bushing 153, which is carried within the section 141*a*. Thus sections 141*a* and 141*b* are normally urged toward an extended position by the compression spring 152**.

Section **141*b* has a threaded portion 154 which is engaged by the nut 156. A laterally extending member 157 is attached to nut 156, and also to the bar 108**.

Operation of the motion applying means described above is as follows: The casting 127 is permitted limited motion relative to the carriage 114 against the action of the compression springs 134, 136. However when the casting 127 is reciprocated by the action of link 132, such reciprocating motion is transmitted through the springs 134, 136, to the tubular section 141*a*, which in turn transmits motion through the lug 143 and clamping device 144 to the carriage 114. Movement of lug 143 and the carriage to the left as viewed in Figure 3A is limited by the stop 137. When the carriage moves in the opposite direction, that is to move the lug 133 toward the right as viewed in Figure 3A, the lug 133 together with the carriage move substantially in unison, until tubular section 141*b* engages the stop collar 138. Thereafter the tubular section 141*b* remains stationary while the tubular section 141*a* continues to move with the carriage, with compression of the spring 152. Member 157, and the bar 108 to which it is connected, remain stationary together with the tubular section 141*b*, thus providing for an interval of pause for the fingers 97, while the fingers 96 continue to move toward the right as viewed in Figure 3A. Simultaneously with horizontal reciprocation of the carriage 114 and the fingers 96, 97, the rods 98 together with the fingers 96 and 97 are likewise horizontally reciprocated in a general direction lateral to the front of the machine by the reciprocating movement applied to the racks 112. As previously explained this reciprocating motion is applied by oscillating motion applied to the shaft 126.

Suitable drive means for the link 132 is illustrated particularly in Figures 8 and 10. A main horizontal drive shaft 158 extends horizontally through the main frame of the machine, and is provided with suitable journal means. Adjacent one end of the machine frame there is a gear box 159, from which extends the shafts 160 and 161 disposed at right angles to each other. Crank arm 162 is fixed to the shaft 161, and is pivotally connected to the adjacent end of link 132. One part 163 of a jaw clutch is freely journaled on the shaft 160, and is adapted to be engaged by the other clutch part 164, which is splined to the main drive shaft 158. Clutch part 164 is engaged by the shifting fork 165, which is carried by the slidable rod 166. By means of the manually operated knob 167, the clutch fork 165 can be shifted to engage or disengage the two clutch parts 163, 164. Within the gear box bevel gears 168 and 169 are attached to the shafts 160 and 161, whereby the crank arm 162 is rotated upon rotation of the shaft 161. Clutch part 163 is provided with a sprocket 181 which is engaged by the drive chain 182. This chain extends to the sprocket 183 (Figure 1) on the main drive shaft 76 of the bag making unit. Shaft 76 is driven by an electric motor (not shown) which thus serves to drive both the bag making unit and the conveying means 23 in unison. The conveying means however is not operated unless the clutch parts 163 and 164 are engaged to cause rotation of the sprocket 181 to drive the shafts 158, 160 and 161.

At that end of the main drive shaft 158 which is remote from the gear box 159, the shaft carries a cam wheel 186 (Figures 5 and 6), which is provided with a cam groove 187. This groove is engaged by a roller 188, carried by the pivoted arm 189. A short horizontal shaft 190 is journaled in the adjacent portion of the frame, and is fixed to the gear segment 191 and the arm 192. Gear segment 191 is engaged with gear teeth formed on the cam arm 189. A gear rack 193 is pivotally attached at 194 to the arm 192, and extends slidably through the gear housing 196. The housing 196 is loosely carried by the adjacent portion of shaft 126, and encloses a gear 197 which is engaged by the rack 193, and which is keyed to the shaft 126. For each revolution of the main shaft 158, the arm 192 is oscillated to reciprocate rack 193, and to oscillate the shaft 126.

The shape of the cam groove 187 is such that for continuous rotation of the main shaft 158, shaft 126 is intermittently rotated in opposite directions, with intervals of pause between the intervals of movement. As previously explained such intermittent rotation of shaft 126 causes like rotation of shafts 121, with intermittent extension and retraction of the gear racks 112. This in turn causes the finger racks 99 and 106 together with the fingers 96 and 97, to be periodically advanced and retracted with respect to the guide rails 91, in synchronism with reciprocation in a horizontal direction and parallel to the rails 91. More specifically the action is such that the fingers 96 and 97 retract until their ends do not extend from the forward edges of rails 91, they are then translated to the right as viewed in Figure 3A (i. e. toward the bag making unit), then they are advanced forwardly to substantially the positions illustrated in Figure 3A to engage bags located between the same, after which they are translated to the left and parallel to the rails 91 to advance the bags one increment, after which they retract to the initial starting position. In addition of the movement just described, before translating movement toward the right as viewed in Figure 3A has been concluded, fingers 97 remain substantially stationary while the fingers 96 advance a further amount, before all of the fingers are moved forwardly through the rails 91. This is by virtue of engagement of tubular section 141*b* with the stop collar 138, as previously described. In effect this serves to widen the gap between adjacent fingers 96 and 97, thereby facilitating their extension upon opposite sides of a bag. This extra spacing between the fingers is immediately eliminated as the fingers are translated in a direction to move the bags along the rails 91.

At the front of the machine I provide a plurality of vertically extending posts or standards 201, which serve to support certain operating parts. Each standard consists of parallel bars 202, which have their upper and lower ends connected by the members 203 and 204 (Figure 9). The lower ends of the members 204 are drilled to receive the horizontal retaining rod 206, the ends of which are fixed to the frame of the machine. Blocks 207 and 208 are adjustably mounted between the bars 202, and can be formed substantially as illustrated in Figure 14. Thus block 207 has grooved side edges, to accommodate the bars 202, and has its lower end bored and threaded to receive the clamping screw 209. Also this lower end of the block is slotted as indicated at 211, whereby upon tightening the screw 209, the block 207 is held fast upon the bars 202. The upper part of the block 207 is bored and fitted with a bushing 212, which has its forward end slotted and threaded to receive the clamping nut 213. A rod 214 extends horizontally through the bushing 212, and can be held in an adjusted position by tightening the nut 213. One end of the rod 214 is attached to member 216, which in turn forms a mounting for the guide rods 92. The guide rods can be positioned in pairs, with one pair being attached to one member 216. The blocks 207 for all of the support standards 201, are similarly provided with rods 214, thereby forming an adequate support for the upper pair of guide rods 92, and enabling adjustable positioning of these guide rods with respect to the stationary guide rails 91. By loosening screws 209, it will be evident that all of the blocks 207 can be raised or lowered.

Each lower block 208 (Figure 14) is provided with parts similar to those described above for the block 207. Thus each block 208 serves to mount a horizontal rod 214 which carries a member 216 that serves to position and support a lower pair of guide rods 92. The lower blocks 208 however need not be adjustable in a vertical direction, and therefore each block is shown attached to a clip 217, which releasably engages a part of the adjacent bag support table.

Each of the upper blocks 207 is also provided with a reciprocating bag engaging finger 218. Each of these fingers is slidably retained within a tube 219, which extends through and is fixed to the block 207, and it is provided with gear teeth 221. One end of each tube 219 forms a mounting for a casing 222, which houses a gear 223 for engaging with the teeth 221. The gears 223 for all of the support standards have slidable driving engagement with a horizontal shaft 224, which is cyclically oscillated by means located at one end of the machine, as will be presently explained.

Mechanism similar to that described above is associated with each block 208. Thus a member 226 is associated with each of the blocks 208, and can be constructed the same as the members 222. Fingers 218 are provided which are reciprocated cyclically by oscillation of a shaft 227, which extends parallel to the shaft 224.

The mechanism for oscillating the shafts 224 and 227 includes the drive post 231 (Figures 9, 15 and 16). This drive post consists of the spaced vertical bars 232 which are secured at their lower ends to the gear housing 233, and at their upper ends by the cross member 234. An upper gear housing 236 is adjustably mounted between the bars 232 and serves to journal the two shafts 237 and 238, which are at right angles to each other. Shaft 237 extends vertically from the gear case 233, while shaft 238 is releasably connected by coupling 239 to the shaft 224. Within the housing 236 the two shafts are operatively connected by the gears 241 and 242, the first being splined to the vertical shaft 237, and the second being keyed to the shaft 238.

It is desirable to provide the housing 236 with an extension lug 243, which serves to carry an adjustable support rod 214 for the guide rods 92.

A second gear housing 244 is secured to the bars 232, below the housing 236. The housing 244 likewise encloses gears, one of which is splined to the shaft 237, and the other keyed to a shaft 245 which is connected by coupling 246 to the shaft 227. An adjustable support rod 214 is similarly provided for the housing 244, and serves to support a lower pair of guide rods 92.

At the lower end of the drive post just described above, the gears within the housing 233 form a direct drive connection between the vertical shaft 237 and the horizontal shaft 250. The latter is provided with a sprocket 247 which is operatively connected to the drive chain 248. The drive chain 248 extends over the idler sprockets 249, 251 (Figure 6) and engages a sprocket 252 which is mounted upon the shaft 126. As previously explained the shaft 126 is periodically oscillated by the rack 193 and other elements illustrated particularly in Figure 5.

It will be evident from the foregoing that the drive means employed through the drive post 231 serves to periodically oscillate the shafts 224 and 227, and this serves to periodically project and retract the fingers 218. The timing is such that the fingers 218 are projected toward the rails 91 in synchronism with retraction of the fingers 96, 97. Thus as the fingers 96, 97 leave the sides of the bag the fingers 218 extend along the upper and lower portions of the bag sides thus holding the bag in a predetermined position, and preventing excess sagging, until the fingers 96, 97 are again projected, at which time the fingers 218 are retracted.

Suitable means is provided for making lateral adjustments of the support standards 201. Thus a horizontal rod 256 has two oppositely threaded portions **256*a* and 256*b*, and is carried by a bracket 257 which in turn is mounted on the front working table of the machine. One end of the rod 256 is squared or otherwise formed for application of a turning crank. A pair of guide rods 258, 259 extend from the bracket 257 to a similar bracket 261. Tubes 262 and 263 are slidably disposed on the rods 258, 259. The first standard 201 at the left hand end of Figure 9 is fixed to the tube 263 by clamping sleeve 264. Progressing toward the right from the left hand end of the machine, every other standard 201 has a similar clamping sleeve 264 for attaching it to the tube 263**.

The second standard 201 from the left as viewed in Figure 9 has a clamping sleeve 266 for securing it to the tube 262. Progressing toward the right, alternate standards are likewise provided with clamping sleeves 266 for securing the same to the tube 262. Devices 267 and 268 are fixed to the tubes 262 and 263, and carry nuts 269 and 271, which are threaded upon the rod 256. It will be evident that upon manually rotating the rod 256, the tubes 262 and 263 are moved in opposite directions whereby the same movement is imparted to alternate standards 201. This type of adjustment is desirable because it enables quick change in the location of the standards 201 to accommodate bags of different sizes. With respect to any one pair of standards 201, the adjustment is about a fixed intermediate center line which coincides with the center line of the bag when at rest between the projecting fingers 218 of the same standards.

Previous reference has been made to the various operating stations, including the weighing and filling station 24, the vibrating or jiggling station 25, and the sealing station 26. The weighing and filling apparatus 273 can be of any suitable automatic type such as the apparatus disclosed and claimed in my copending application Serial No. 167,403, filed June 10, 1950. The sealing apparatus 274 can likewise be of any suitable type, although for this purpose I prefer to employ the sealing equipment disclosed and claimed in my application Serial No. 89,445, filed April 25, 1949.

The jiggling means employed may be any suitable mechanism for applying vertical vibratory or jarring movements to the bags, and preferably the jarring action is extended for two adjacent rather than a single station. Thus the bag supporting rail 83 is interrupted to accommodate the rail section **83*a* which is attached to suitable jarring means. As shown in Figure 7 the rail section 83*a* is carried by a screw 276, which is similar to the threaded support rods 86 for the remainder of the working table. The threaded rod 276 extends downwardly through the gear housing 278, within which it has threaded engagement with the sleeve 279. The sleeve 279 is in turn splined to one of the gears within the housing 278, and this gear engages a worm or gear attached to the shaft 88. Thus sleeve 279 and rod 276 are free to move a limited amount in a vertical direction, and the rod 276 is adjusted in a vertical direction together with the threaded rods 86, when the shaft 88 is turned manually. The sleeve 279 has a portion 281 which extends below the housing 278, and is surrounded by the compression spring 282. A spool 283 is attached to the lower end of extension 281, and is engaged by the forked lever 284. This lever is carried by pivot 286, and is connected with a cam lever 287 which engages the partially toothed periphery of the cam wheel 288. This cam wheel is secured to the main drive shaft 158. Upon continuous rotation of the cam wheel 288, arms 287 and 284 are periodically oscillated, and this serves periodically to impart a vertical vibratory motion to the threaded rod 276 and the rail section 83*a***.

Operation of the machine described above can be reviewed as follows: A web of suitable material such as moisture-proof cellophane, Pliofilm, polyethylene or the like, is supplied to the bag making unit, and is placed in operative condition for the successive manufacture of heat sealed bags. Assuming now that the machine is in operation, the bags as produced by the unit 21 are received and conveyed by the means 22 and delivered in upright position to the receiving end of the conveying means 23, between the strips 93 and the guide rails 91. The bag is now moved by predetermined increments across the working table of the machine, and under the action of the fingers 96 and 98. When it arrives at the filling station 24, it receives a measured or weighted amount of a product. Immediately after leaving the filling station it passes through the jiggling station or stations 25, which serve to apply jiggling action to settle or compact the product. When the bag arrives at the sealing station 26 an automatic heat sealing operation is applied to the top of the bag, after which the bag is progressed off of the left hand end of the machine as viewed in Figure 2.

Figures 18, 19, 20, 21, 22:
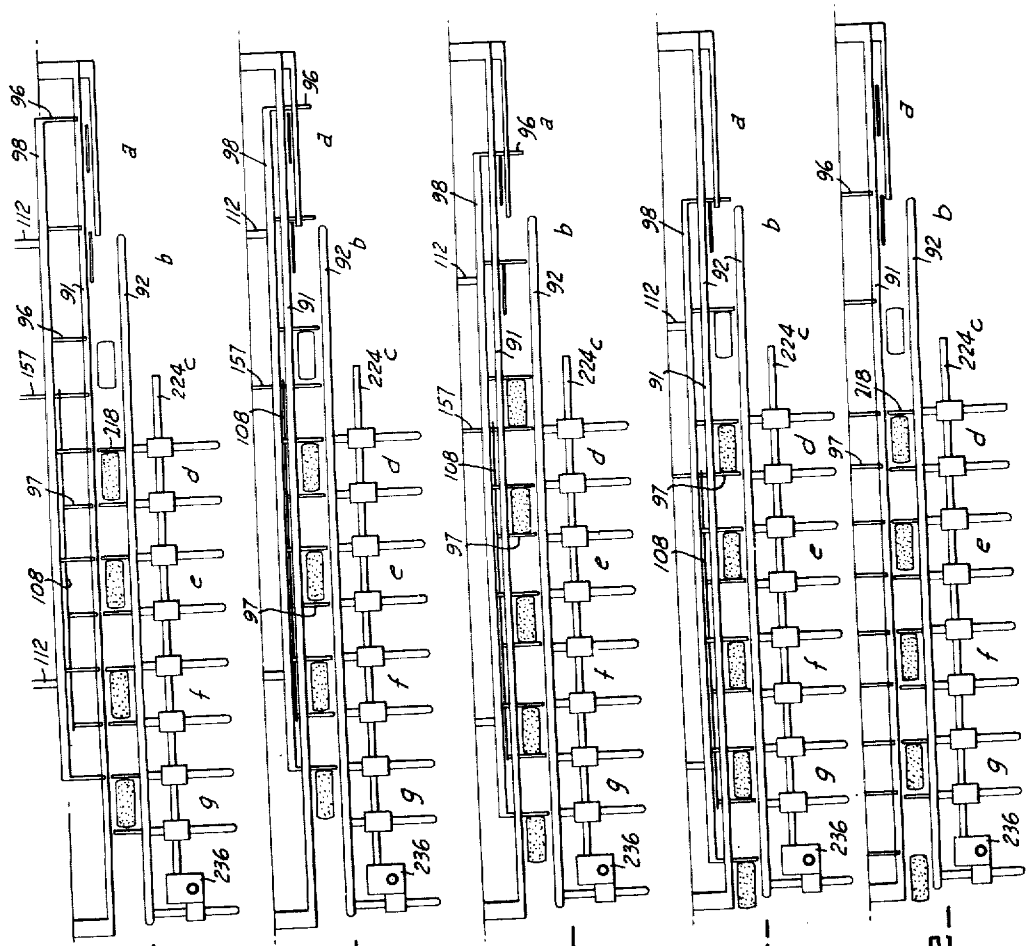

The action of the fingers 96 and 97 for progressing the bag from one position to the next, and also the action of the fingers 218, can be more clearly understood by referring to Figures 18 to 22 inclusive. In each of these views regularly spaced positions *a, b, c, d, e, f* and *g* have been indicated. These are the positions in which the bag is momentarily at rest. Position *a* can correspond to the receiving station, position *c* to the filling station, positions *d* and *e* to the jiggling stations and position *f* can be the sealing station. In Figure18 the fingers 96 and 97 are shown retracted but ready to be projected into engagement with the bags. Note that the spacing between pairs of fingers is slightly greater than the width of the bag. The fingers 218 is Figure 18 are extended in pairs to engage the sides of the bag for the filling station *c*, and also for the successive stations *d, e, f* and *g*. From the positions shown in Figure 18, the parts advance to the positions shown in Figure 19. Thus the fingers 96 and 97 have been advanced alongside the bags while the fingers 218 have simultaneously retracted. The spacing between the fingers 96 and 97 of each pair remains slightly greater than the width of the bags. As the parts progress from the positions of Figure 19 to that of Figure 20, the fingers 96 and 97 move together a sufficient distance to lightly engage the sides of the bag, and simultaneously these fingers are moved to the left to progress each bag one increment. This movement is completed in Figure 21, and immediately thereafter the fingers 96 and 97 commence to retract, while fingers 218 are simultaneously extended. In the position of the parts illustrated in Figure 22, the fingers 218 have been fully extended to engage the sides of the bags, and the fingers 96 and 97 have been fully retracted.

By means of the various adjustments the machine can be adjusted to handle bags of various sizes and such adjustment can be made while the machine is in operation, thus facilitating observation of the results.

I claim:

1. Bag conveying means of the character described comprising a horizontal supporting table along which the bags are adapted to be intermittently moved, bag engaging elements adapted to engage the bags to move the same, vertically disposed racks serving to mount said elements to provide horizontally spaced groups of the same, means for imparting substantially rectangular motion to said racks and said bag engaging elements whereby said elements are caused to be projected alongside of the bags, translated longitudinally of said supporting table to move the bags therealong, retracted from the bags, and then returned to their initial positions, and means for causing a limited relative movement between adjacent racks to cause the elements of the same to engage both the trailing and advancing edges of bags while the bags are being moved over the supporting table.

2. Conveying apparatus as in claim 1 in which said last mentioned means includes a carriage adapted to reciprocate in a direction parallel to the direction of extent of the supporting table, actuating means for reciprocating said carriage, and lost motion means for causing said relative movement between said adjacent racks.

3. Bag conveying apparatus of the character described, comprising a horizontal bag supporting table, bag engaging elements adapted to engage the bags to intermittently move the same longitudinally of the table, a carriage, means guiding the carriage for horizontal reciprocating movement parallel to the table, actuating means for reciprocating said carriage, horizontally spaced racks serving to mount said bag engaging elements in groups, the elements of each group being vertically spaced and aligned, mounting means for all of said racks, alternate racks being slidable horizontally and in a direction parallel to said table, means forming a common mechanical connection between all of said last named racks whereby said last named racks are caused to move conjointly relative to the other racks, means serving to carry said last named mounting and being in turn mounted upon said carriage, said last named means serving to impart motion to all of said racks in a horizontal direction at right angles to the direction of the table, common drive means for said last named means and for reciprocating said carriage, whereby said bag engaging elements are caused to have substantially rectangular motion whereby said elements are caused to be projected alongside the bags, translated longitudinally of said table to move the bags, retracted from engagement with the bags, and then returned to their initial positions, and means for causing alternate racks and the elements carried by the same to move horizontally relative to said other racks to thereby cause elements to engage both the trailing and advancing edges of bags while moving bags along said table.

4. Bag conveying apparatus as in claim 3 in which said last named means includes a lost motion connection between said alternate racks and said carriage.

5. Conveying apparatus as in claim 1 together with means for engaging said bags while said elements are being returned to their initial position.

6. Conveying apparatus as in claim 3 together with spaced back and front support guide means extending the length of said supporting table.

7. Conveying apparatus as in claim 6, said back support means comprising a plurality of guide rails vertically spaced to allow said bag engaging elements to move therebetween, and said front support means comprising guide strips at the receiving end of said supporting table and in relatively close proximity to said guide rails for receiving flat empty bags, and vertically spaced guide rods extending the remainder of the length of said supporting table and spaced from said guide rails for receiving opened bags.

8. Conveying apparatus as in claim 3 together with means for engaging said bags while said elements are being returned.

9. Conveying apparatus of the character described comprising a horizontal supporting table along which the bags are adapted to be intermittently moved, bag engaging elements on one side of said table for engaging the trailing edges of said bags to move the same, additional bag engaging elements for engaging the advancing edges of said bags, the normal spacing between adjacent first named bag engaging elements and second named bag engaging elements being slightly greater than the width of said bags, means for imparting substantially rectangular motion to said first and second named bag engaging elements in synchronism whereby said bag engaging elements are caused to be extended alongside of said bags, translated longitudinally of the bag supporting table to move the bags, retracted from engagement with the bags, and then returned to their initial position, and means for causing relative movement between said first and second named bag engaging elements to engage both the advancing and the trailing edges of said bags after said bag engaging elements have been extended alongside of said bags and while the bags are being moved.

10. Bag conveying apparatus as in claim 9 together with additional means for engaging the advancing and trailing edges of said bags while said first and second named bag engaging elements are not engaging said bags.

11. Bag conveying apparatus as in claim 9 together with additional means for engaging the advancing and trailing edges of said bags while said first and second named bag engaging elements are not engaging said bags, said last named means comprising a plurality of bag engaging fingers disposed on the other side of said table across from said first and second named bag engaging elements, said bag engaging fingers being adapted to engage the trailing and advancing edges of said bags, means for retracting said bag engaging fingers from engagement with said bags simultaneously with the extension of said bag engaging elements, and for extending said bag engaging fingers into engagement with said bags simultaneously with the retraction of said bag engaging elements.

12. Conveying apparatus as in claim 1 together with means for adjusting the horizontal spacing between adjacent racks.

13. Conveying apparatus as in claim 12 together with back support guide means extending the length of said horizontal supporting table.

14. Conveying apparatus as in claim 13 together with front support guide means extending the length of said horizontal supporting table and being spaced from said back support guide means.

15. Conveying apparatus as in claim 14 wherein said back support means comprises a plurality of guide rails vertically spaced to allow said bag engaging elements to move therebetween, and wherein said front support guide means comprises guide strips at the receiving end of said supporting table in relatively close proximity to said guide rails for receiving flat empty bags, and vertically spaced guide rods extending the remainder of the length of said supporting table and spaced from said back support guide means for receiving opened bags.

16. Conveying apparatus as in claim 15 together with means for adjusting the vertical position of said guide rods, and means for adjusting the lateral spacing of said guide rods with respect to said guide rails.

17. Bag conveying apparatus of the character described comprising an extended horizontal bag supporting table, bag engaging elements adapted to engage advancing and trailing edges of the bags to move the same along the table, vertically disposed racks serving to mount said elements to provide horizontally spaced groups of the same, vertically spaced guide rails disposed alongside of the table, means for imparting substantially rectangular motion to said racks and said elements whereby said elements are caused to be projected alongside of the bags, translated longitudinally of the table to move the bags, retracted from engagement with the bags, and then returned to their initial positions, a plurality of guide rods disposed alongside of the table and in front of said guide rails, a plurality of bag engaging fingers adapted to engage the advancing and trailing edges of said bags and disposed above the table and in front of said guide rods, a plurality of vertically disposed standards serving to mount said fingers to provide horizontally spaced groups of the same and means for cyclically reciprocating said fingers to cause the same to be projected between said guide rods and alongside said bags while said elements are being returned to their initial positions.

18. Bag conveying apparatus of the character described comprising an extended horizontal bag supporting table, vertically spaced guide rails disposed alongside said table and forming a vertically disposed guide surface for engaging one side of the bags, bag engaging elements adapted to engage the bags and to move the same along the length of the table, means for imparting substantially rectangular motion to said bag engaging elements whereby said elements are caused to be projected between said guide rails to positions alongside the bags, translated longitudinally of the table to move the bags, retracted from engagement with the bags and then returned to their initial positions, supplemental vertically spaced bag guiding members disposed above the table in front of said guide rails and forming a vertically disposed guide surface for engaging the side of the bags opposite the side of the bag engaged by said guide rails, said guide rails together with said last named bag guiding members providing a path of movement for bags along the table, a plurality of standards in front of said supplemental guide members, a plurality of vertically spaced bag engaging fingers slidably mounted in horizontally spaced groups upon said standards and extending at substantially right angles to said guide rails, said fingers being adapted to engage the advancing and trailing edges of said bags, means mounted on said standards for adjustably supporting said guide members, and means for cyclically reciprocating said fingers to cause the same to be projected between said guide members and alongside said bags while said elements are being returned to their initial positions.

19. Bag conveying means of the character described comprising a horizontal supporting table along which the bags are adapted to be intermittently moved, bag engaging elements adapted to engage the bags to move the same along the table, vertically disposed racks serving to pivotally mount said elements whereby said elements may be moved between a bag engaging position and an out-of-the-way position, said elemnts being mounted in horizontally spaced groups, means for imparting substantially rectangular motion to said racks and said bag engaging elements whereby said elements are caused to be projected alongside of the bags, translated longitudinally of said supporting table to move the bags therealong, retracted from the bags, and then returned to their initial positions, means for adjusting said supporting table in a vertical direction, and means mounted on said racks for retaining certain of said elements in their out-of-the-way position to accommodate the table when it is in a raised position.

20. Bag conveying means as in claim 19 together with means for causing a limited relative movement between racks to cause the elements of the same to engage both the trailing and advancing edges of the bags while they are being moved over the supporting table.

21. The combination of bag conveying means of the character described comprising a horizontal bag supporting table on which the bags are adapted to be intermittently moved, bag engaging elements adapted to engage the bags to move the same along the table, means for imparting motion to said bag engaging elements whereby said elements are caused to be projected alongside of the bags, translated longitudinally of said table to move the bags, retracted from engagement with the bags and then returned to their initial positions, bag filling means disposed adjacent to the table for introducing material into the bags, means for applying jiggling motion to a predetermined portion of said table, only when a filled bag is resting on the predetermined portion of said table, and means for adjusting said table in a vertical direction and for affecting a simultaneous vertical adjustment of the jiggling means.

References Cited in the file of this patent

UNITED STATES PATENTS

| | | |
|---|---|---|
| 430,954 | Holliday | June 24, 1890 |
| 1,024,012 | Matthews et al. | Apr. 23, 1912 |
| 1,285,720 | Jennings | Nov. 26, 1918 |
| 1,309,785 | Taylor | July 15, 1919 |
| 1,371,968 | Clement | Mar. 15, 1921 |
| 1,426,039 | Candee | Aug. 15, 1922 |
| 1,469,557 | Goebel | Oct. 2, 1923 |
| 1,575,723 | Smith et al. | Mar. 9, 1926 |
| 1,653,648 | Malocsay | Dec. 27, 1927 |
| 1,655,580 | Stuedeman | Jan. 10, 1928 |
| 1,686,404 | Calahan | Oct. 2, 1928 |
| 2,011,839 | Anderson | Aug. 20, 1934 |
| 2,136,901 | Ferguson | Nov. 15, 1938 |
| 2,357,799 | Almgren | Sept. 12, 1944 |
| 2,548,222 | Kindseth | Apr. 10, 1951 |
| 2,583,106 | Kayat | Jan. 22, 1952 |

FOREIGN PATENTS

| | | |
|---|---|---|
| 623,288 | Great Britain | May 16, 1949 |

U. S. DEPARTMENT OF COMMERCE

PATENT OFFICE

CERTIFICATE OF CORRECTION

Patent No. 2,773,341 | Rene J. Gaubert | December 11, 1956

It is hereby certified that error appears in the printed specification of the above numbered patent requiring correction and that the said Letters Patent should read as corrected below.

Column 3, line 16, for "33, 34" read -- 43, 44 --; line 66, for "engaged" read -- engage --; column 5, lines 20 and 21, for "adjusted" read -- adjustable --; column 8, line 15, for "of the" read -- to the --; column 10, line 66, for "96 and 98" read -- 96 and 97 --; line 67, for "weighted" read -- weighed --; column 11, lines 5 and 7, for the letter "a", italicized, each occurrence, read "a" italicized and underscored; column 12, line 39, after "returned" and before the period insert -- to their initial position --.

Signed and sealed this 27th day of May 1958.

(SEAL)
Attest:
KARL H. AXLINE

Attesting Officer

ROBERT C. WATSON
Commissioner of Patents